(12) United States Patent
Forster (10) Patent No.: US 10,191,138 B2
(45) Date of Patent: Jan. 29, 2019

(54) RFID-BASED SYSTEMS FOR MONITORING LARGE AREAS

(71) Applicant: Avery Dennison Retail Information Services LLC, Mentor, OH (US)

(72) Inventor: Ian J. Forster, Chelmsford (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 282 days.

(21) Appl. No.: 15/096,519

(22) Filed: Apr. 12, 2016

(65) Prior Publication Data
US 2017/0293014 A1 Oct. 12, 2017

(51) Int. Cl.
*G01S 3/02* (2006.01)
*G01S 5/02* (2010.01)
*G06K 7/10* (2006.01)
*G01S 13/74* (2006.01)

(52) U.S. Cl.
CPC .......... *G01S 5/0263* (2013.01); *G01S 5/0284* (2013.01); *G01S 13/74* (2013.01); *G06K 7/10366* (2013.01)

(58) Field of Classification Search
CPC .............................. G01S 5/0263; G01S 5/0284
USPC ......... 342/357.34, 450, 463–465; 455/456.1, 455/456.3
See application file for complete search history.

(56) References Cited

U.S. PATENT DOCUMENTS

| 9,187,154 B2 * | 11/2015 | Hansen | B63B 22/16 |
| 2012/0167487 A1 * | 7/2012 | Culp | E02D 27/12 52/127.4 |
| 2016/0212579 A1 * | 7/2016 | Duan | G01S 5/02 |
| 2016/0316325 A1 * | 10/2016 | Sadr | H04W 4/02 |

* cited by examiner

*Primary Examiner* — Dao L Phan
(74) *Attorney, Agent, or Firm* — Avery Dennison Retail Information Services, LLC (57) ABSTRACT

A system for locating RFID tags in an area includes a platform and an RFID reader head associated with the platform. At least one support extends between the platform and an anchor position within an area. Separate support adjustment devices are associated with each support, with each support adjustment device being operable to adjust the length of the associated support between the platform and the anchor position associated with the support. So adjusting the length of the support varies the location of the RFID reader head in the area, thereby allowing an RFID reader associated with the RFID reader head to monitor a larger area than would otherwise be possible if the RFID reader were to remain in a fixed location. The RFID reader head itself may be movable with respect to the platform for finer adjustment of the position of the RFID reader.

15 Claims, 10 Drawing Sheets

RFID-BASED SYSTEMS FOR MONITORING LARGE AREAS

BACKGROUND OF THE INVENTION

Field of the Disclosure

The present subject matter relates to radio frequency identification ("RFID") monitoring systems. More particularly, the present subject matter relates to systems having a mobile RFID reader for monitoring relatively large areas, such as warehouses, "superstores", distribution centers, transportation terminals and the like.

Description of Related Art

It is known to employ RFID technology in an area (e.g., a store or warehouse or other retail environment) for various purposes. In one example, an RFID reader is associated with a point-of-sale location or check-out counter of a store and detects a tag associated with an item being purchased to register the price of the item. In another example, an RFID-readable tag or transponder is attached to each piece of merchandise in a store or storage area. The tags are scanned using an RFID reader to keep proper count of the product inventory. In yet another example, RFID technology is used as a security measure. In a typical RFID-based security system for a store, one or more RFID readers are installed adjacent to an exit, while guard tags are associated with (often by means of a hangtag or label) individual items sold in the store. When a customer purchases an item, the cashier will either remove or otherwise deactivate the guard tag associated therewith. If the guard tag has not been removed or deactivated (e.g., if a customer attempts to remove the item from the store without paying for it), the RFID reader or readers in the read field will sense the guard tag as the customer is exiting the store. Upon sensing the guard tag, the read field causes an alarm or other alert to trigger, thereby alerting store personnel to possible theft of the item.

Although the above-described systems are widespread, there are certain disadvantages, particularly when there is a large area to be monitored (e.g., a warehouse or storage area). Existing methods of locating items in large areas may include the use of electronically directional antennae, hand-held RFID readers that are carried by people, readers that are mounted on movable devices, e.g. robots or forklifts, and/or a multiplicity of RFID readers arranged throughout the monitored area.

SUMMARY OF THE INVENTION

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, a system for locating RFID tags in an area includes a platform having an RFID reader associated therewith. At least one support extends between the platform and an anchor position within the area, with a separate anchor position being associated with each support. The system further includes at least one support adjustment device, with a separate support adjustment device being associated with each support. Each support adjustment device is operable to adjust the length of the associated support between the platform and the anchor position associated with the support, thereby varying the location of the RFID reader head in the area.

In another aspect, a method of locating RFID tags in an area includes providing a platform with an RFID reader head associated therewith. The platform is secured to an anchor position of the area in a manner allowing for the distance between the platform and the anchor position to be varied. The RFID reader head is then moved along a three-dimensional path through the area.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

In retail stores, an accurate count of the products on display and/or in storage is important. In a typical inventory system, individual items may include an RFID-readable tag or transponder and be counted by a staff member moving around the store area and using a handheld RFID reader to read each RFID tag. Exemplary RFID tags and readers for use in this invention are available from Avery Dennison Retail Information Services, LLC of Westborough, Mass. and Miamisburg, Ohio and sold under trademarks such as SmartFace™ and Monarch®.

The accuracy of the count depends on the staff member visiting all of the locations in which the items are stored or displayed, taking sufficient time at each location to capture the highest possible percentage of tags present, and orienting and moving the RFID reader around and between the items in an optimal fashion. Ideally, with sufficient training, the staff member will do a complete and thorough job, but the quality of day-to-day performance can vary and may drop over time. Furthermore, the ability of a staff member to monitor inventory at certain locations (in particular, items positioned at a significant height, such as on the top of a stack of items or on a high shelf, or in open areas, such as areas for storing containers from ships) and times (e.g., overnight) may be limited. While monitoring systems according to the present disclosure have particular utility in inventory storage applications and will be described in such a context, it should be understood that systems according to the present disclosure are not limited to particular areas or monitoring situations.

Monitoring systems according to the present disclosure are suitable for detecting or otherwise interacting with RFID-readable tags or transponders 10a-10c in a large area. Frequently, each RFID tag 10a-10c is associated with an individual piece of merchandise in an inventory storage location or warehouse, but it is within the scope of the present disclosure for the RFID tags 10a-10c to be associated with any other item or carrier (which may include a living carrier, such as a human). Depending on the nature of the item or carrier to which the tag 10a-10c is associated, the tag 10a-10c may be associated with the item or carrier by any of a number of means, such as a hang card or an adhesive material. The RFID tag 10a-10c may contain information related to the item or carrier, such as its SKU or price in the case of a merchandise tag. In some cases, the RFID tags 10a-10c are unique (such as when each RFID tag 10a-10c identifies a living carrier), while in other cases the RFID tags 10a-10c are not unique (such as when several identical items or pieces of merchandise have the same product tag). As shown in FIGS. 1-10, the RFID tags 10a-10c may be dispersed throughout the large area, at locations that are sufficiently spaced apart that a single RFID reader cannot detect all of the RFID tags 10a-10c without being moved through the area.

Systems according to the present disclosure include a platform 12, with an RFID reader head 14 associated therewith. In some embodiments (FIGS. 1, 2, and 5-10) the RFID reader head 14 is incorporated into the platform 12 or otherwise fixedly secured to the platform 12, while in other embodiments the RFID reader head 14 is movable or adjustable with respect to the platform 12 (FIGS. 3 and 4), as will be described in greater detail herein. The RFID reader head 14 includes an RFID reader that is capable of sending signals to and/or receiving signals from the RFID tags 10a-10c in the area. The RFID reader head 14 may include additional components without departing from the scope of the present disclosure, such as an internal power source that provides power to the RFID reader (as will be described in greater detail herein).

The platform 12 is associated with at least one support 16a, with another portion of the support 16a being associated with an anchor position 18a at a different location within the area. Preferably, the platform 12 is supported by a plurality of supports 16a-16d, for improved mobility of the platform 12 and RFID reader head 14 through the area. In the illustrated embodiments, the platform 12 has a plurality of supports 16a-16d, with each support 16a-16d having an associated anchor position 18a-18d. While the illustrated embodiments include four supports 16a-16d, it is within the scope of the present disclosure for a system to include fewer or more than four supports or other structural configuration to assist in mounting the platform.

Preferably, the anchor positions 18a-18d are spaced throughout the area, which increases the range of movement of the platform 12 and RFID reader head 14 through the area. In the illustrated embodiments, the anchor positions 18a-18d are located at the four upper corners of the area, which increases the percentage of the area that may be monitored by the RFID reader of the RFID reader head 14 and decreases the risk of the platform 12 and RFID reader head 16 (or a support 16a-16d) coming into contact with a person or object within the area, but it is within the scope of the present disclosure for the anchor positions 18a-18d to be located anywhere else within the area.

The length of each support 18a-18d between the platform 12 and the associated anchor position 18a-18d may be varied by operation of a support adjustment device 20a-20d associated with each support 16a-16d. For the purposes of simplified terminology, the term "length" will be used herein when referring to the distance between the position at which a support 16a-16d is associated to the platform 12 and the anchor position 18a-18d of the support 16a-16d, and it should be understood that this "length" may be different from the total length of the support 16a-16d.

Figure 1:
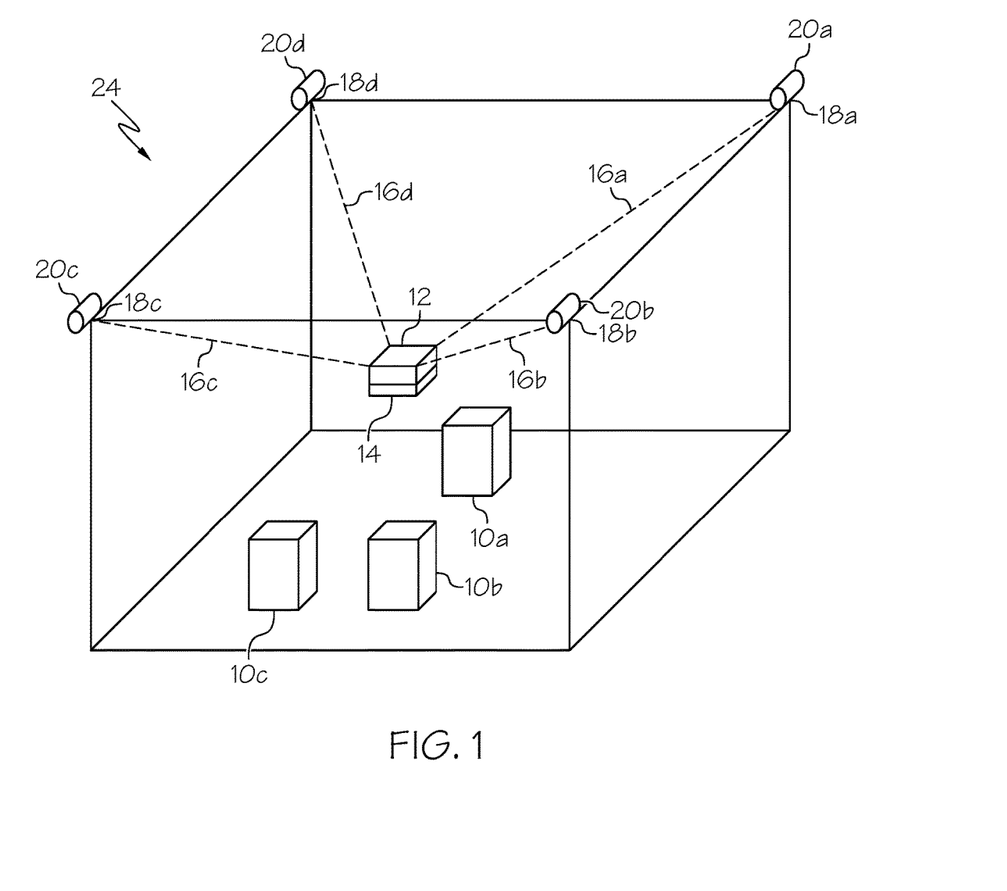
FIG. 1 is a perspective view of a system for locating RFID tags in a large area, using a single RFID reader that may be moved through the area.
Figure 2:
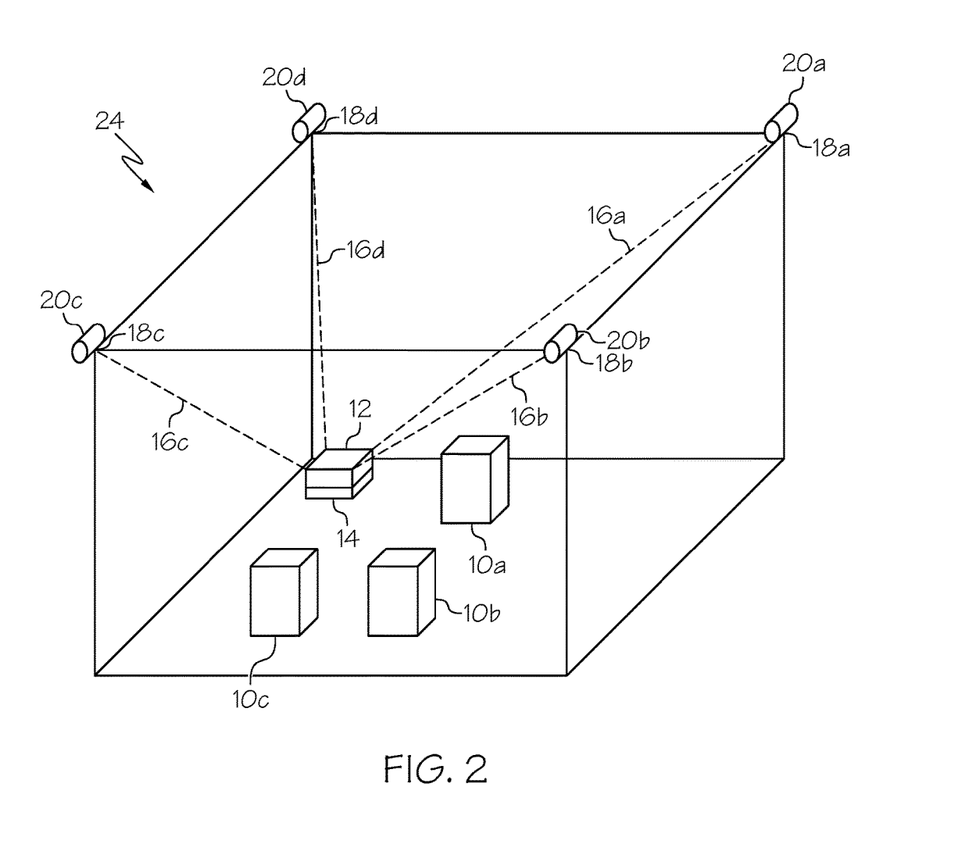
FIG. 2 is a perspective view the system of FIG. 1, with the RFID reader positioned at a different location within the area.

Adjusting the length of one or more supports 16a-16d causes the platform 12 and RFID reader head 14 to be moved from one location within the area (FIG. 1) to any of a number of other locations (FIG. 2). The length of one or more supports 16a-16d may also be adjusted to change the orientation (in particular, the tilt) of the platform 12 and RFID reader head 14, should it be desirable for the platform 14 to be oriented at an angle to the ground, rather than being substantially parallel to the ground. Frequently, the lengths of all of the supports 16a-16d must be adjusted (either simultaneously or sequentially or via a combination of simultaneous and sequential adjustment) to move the platform 12 to a desired location and orientation, but there are also circumstances in which it is possible to move the platform 12 from a first location to a second location (and/or from a first orientation to a second orientation) by adjusting the length of fewer than all of the supports 16a-16d. By moving the platform 12 and RFID reader head 14 to a different location (and/or orientation), the RFID reader of the RFID reader head 14 may interact with a different selection of RFID tags 10a-10c. For example, in the position of FIG. 1, the RFID reader may only have sufficient range to locate and otherwise interact with one of the RFID tags 10a. By moving the platform 12 and RFID reader head 14 to the location of FIG. 2, the RFID reader may lose the ability to interact with the first RFID tag 10a, but moves into close enough proximity to the other two RFID tags 10b and 10c so as to be able to communicate with them. Accordingly, systems according to the present disclosure may be employed to monitor a large three-dimensional area using a single RFID reader having a limited range. Systems according to the present disclosure also allow for smaller RFID tags with lower read range, which may be less expensive than larger RFID tags with greater read range.

The adjustment of the length of the supports 16a-16d may be achieved in any of a number of ways, which may depend on the configuration of the support 16a-16d and the associated support adjustment device 20a-20d. In one embodiment, each support 16a-16d is generally flexible or deformable, such as being provided as a tether or wire. In this case, the support adjustment devices 20a-20d may be provided as winches, with each winch having a drum or cylinder that is rotated in one direction around its central axis to wind the associated tether onto the drum or cylinder and in the opposite direction to unwind the associated tether from the drum or cylinder. Winding the tether onto the drum or cylinder decreases the length of the tether, while unwinding the tether from the drum or cylinder increases the length of the tether. Other mechanisms for adjusting the length of a tether or flexible support may also be employed without departing from the scope of the present disclosure.

In other embodiments, the supports 16a-16d may be generally rigid, such as rigid rods or telescoping rods. In the case of rigid rods, one portion of a rod may be pivotally secured to the platform 12 or at the anchor position 18a-18d, while another portion of the rod is pivotally and slidably associated with the other one of the platform 12 and the anchor position 18a-18d. The rod may be slid in a direction along its axis (by operation of the associated support adjustment device 20a-20d) to adjust its length, while pivoting at the platform 12 and anchor position 18a-18d to guide the platform 12 and RFID reader head 14 to a different position within the area. In the case of telescoping rods, the rod may be pivotally connected at its ends to the platform 12 and the associated anchor position 18a-18d. The associated support adjustment device 20a-20d may be operated to collapse one or more segments of the rod into each other, thereby decreasing the length of the support, or operated in a reverse direction to retract one or more segments from within another segment to increase the length of the support. Other generally inflexible supports and methods and mechanisms for adjusting the length and orientation of such supports may also be employed without departing from the scope of the present disclosure.

If more than one support 16a-16d and support adjustment device 20a-20d are provided, it may be advantageous for the operation of the support adjustment devices 20a-20d to be synchronized to better control the movement of the platform 12 and RFID reader head 14 through the area. The control of the support adjustment devices 20a-20d may be incorporated into the RFID reader head 14 or it may be controlled by a separate host system 22 (FIGS. 7-10) or other controller. For purposes of simplifying the control system, it may be preferred for all of the supports 16a-16d and support adjustment devices 20a-20d (or at least all of the support adjustment devices 20a-20d) to be similarly configured (e.g., supporting the platform 12 and RFID reader head 14 with only tethers that are adjusted by winches). However, it is also within the scope of the present disclosure for different supports and/or support adjustment devices of the same system to be differently configured (e.g., with one support being a flexible tether and another being a rigid rod).

In the illustrated embodiments, the support adjustment devices 20a-20d are shown as being located at the anchor position 18a-18d of the associated support 16a-16d, but it is also within the scope of the present disclosure for a support adjustment device 20a-20d to be spaced away from the anchor position 18a-18d of the associated support 16a-16d. For example, in one embodiment, one or more of the support adjustment devices 20a-20d are located at the platform 12, rather than at the anchor position 18a-18d of the associated support 16a-16d. This increases the weight that must be supported by the supports 16a-16d, which may require the provision of stronger, more expensive supports 16a-16d, so it may be preferred for the support adjustment devices 20a-20d to be located at the anchor positions 18a-18d of their respective supports 16a-16d, as shown.

Figure 3:
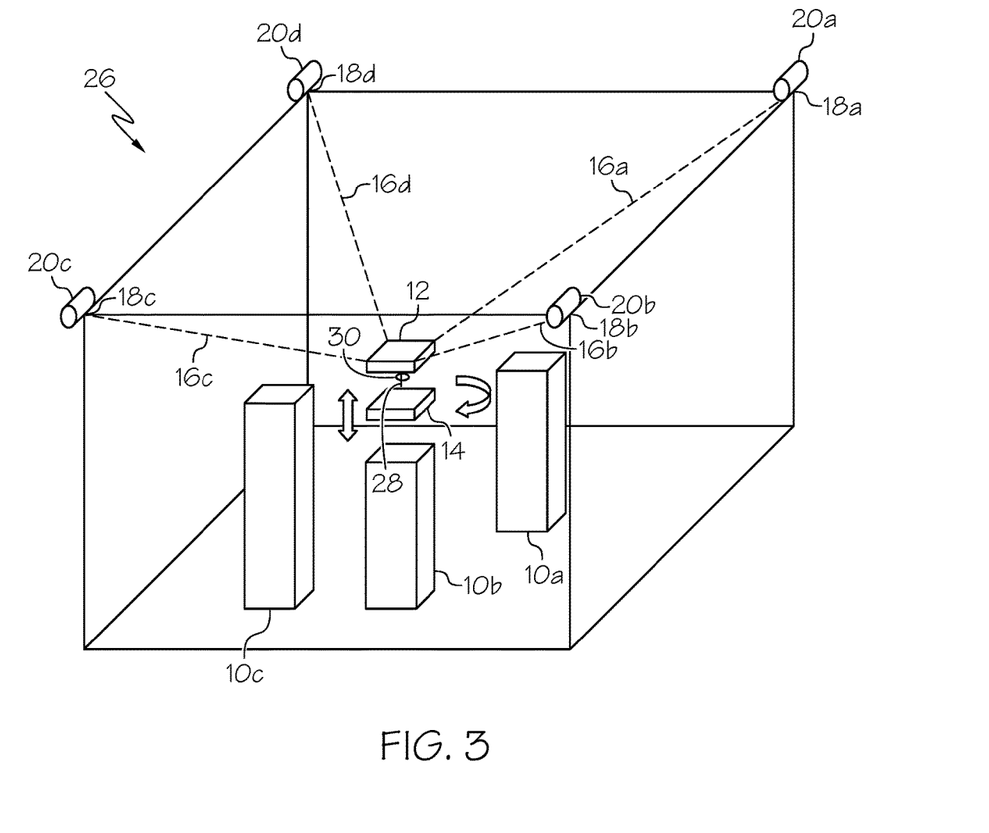
FIG. 3 is a perspective view of another embodiment of a system for locating RFID tags in a large area, with an RFID reader that is movable in a vertical direction with respect to a platform of the system.

FIG. 3 illustrates a variation to the system 24 of FIGS. 1 and 2. In the system 26 of FIG. 3, the RFID reader head 14 is not integrated into or fixedly secured to the platform 12, but is configured to be moved and/or reoriented with respect to the platform 12. This allows the platform 12 to remain at a more elevated position than where it would be at for the system 24 of FIGS. 1 and 2 when the RFID reader head 14 is at a given location, which may be advantageous in terms of preventing the supports 16a-16d from snagging on or otherwise contacting objects within the area (especially when the RFID reader head 14 is to be moved to a location adjacent to a bottom surface or floor of the area).

In the embodiment of FIG. 3, a lower or secondary support 28 is associated with the platform 12 and the RFID reader head 14, allowing the RFID reader head 14 to be moved toward and away from the platform 12 in a "Z" or vertical direction under the operation of an associated lower support adjustment device 30. The lower support 28 may be provided in accordance with the foregoing description of the (upper) supports 16a-16d (e.g., being a flexible tether or rigid, etc.) and the lower support adjustment device 30 may be provided in accordance with the foregoing description of the (upper) support adjustment devices 20a-20d (e.g., being a winch, etc.). The length of the lower support 28 between the platform 12 and the RFID reader head 14 may be varied by operation of the associated lower support adjustment device 30, which may be associated with either the platform 30 (e.g., an underside of the platform 12, as shown) or the RFID reader head 14 (e.g., a top surface of the RFID reader head 14). In one embodiment, the lower support 28 may be rotatably associated with the platform 12 and/or the RFID reader head 14, which allows the orientation of the RFID reader head 14 to be adjusted with respect to the platform 12 by rotating the lower support 28 (and, hence, the RFID reader head 14) about a "Z" or vertical axis. In such an embodiment, it may be advantageous for the lower support 28 to be generally rigid to better control the orientation of the RFID reader head 14 with respect to the platform 12 when the lower support 28 is rotated.

Figure 4:
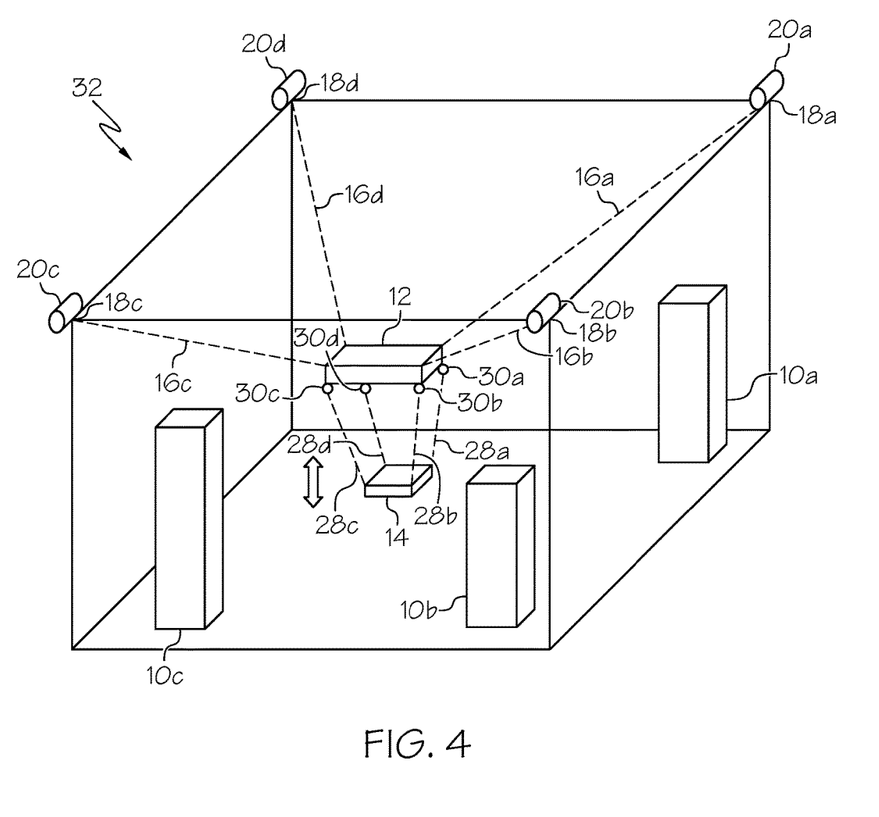
FIG. 4 is a perspective view of another embodiment of a system for locating RFID tags in a large area, with an RFID reader that is movable in three dimensions with respect to a platform of the system.

FIG. 4 illustrates a system 32 that is a variation of the system 26 of FIG. 3. In the embodiment of FIG. 4, a plurality of lower or secondary supports 28a-28d are provided between the platform 12 and the RFID reader head 14. Each lower support 28a-28d may be provided with its own associated lower support adjustment device 30a-30d, which may be associated with either the platform 12 or the RFID reader head 14. The lower supports 28a-28d may be provided in accordance with the foregoing description of the (upper) supports 16a-16d (e.g., being flexible tethers or rigid rods, etc.) and the lower support adjustment devices 30a-30d may be provided in accordance with the foregoing description of the (upper) support adjustment devices 20a-20d (e.g., being winches, etc.). While FIG. 4 illustrates four lower supports 28a-28d, it should be understood that a different number of lower supports may be provided without departing from the scope of the present disclosure.

While the systems 24 and 26 of FIGS. 1-3 are capable of maneuvering the RFID reader head 14 into any position within the area, it will be seen that the system 32 of FIG. 4 may have certain advantages. For example, the (upper) supports 16a-16d (which preferably have anchor positions 18a-18d that are much more widely spaced than the locations at which the lower supports 28a-28d are secured to the platform 12 and RFID reader head 14) may be used for coarse control of the position of the platform 12 and RFID reader head 14. When the length of the (upper) supports 16a-16d has been adjusted to place the platform 12 and RFID reader head 14 in the immediate vicinity of the target location, the length of the lower supports 28a-28d may be adjusted to fine tune the location of the RFID reader head 14 and move it into the precise desired position and orientation.

Each location within the area has an associated set of support lengths that is unique. If the RFID reader head 14 is movable with respect to the platform 12, then different support lengths may be used to place the RFID reader head 14 at the same location (by adjusting the length of the lower support 28 or lower supports 28a-28d), but even then the location of the platform 12 at that RFID reader head 14 position is unique. Accordingly, if a controller of the system is aware of the length of each support 16a-16d (and of each lower support 28-28d, if provided), then it can calculate or otherwise determine the location of the platform 12 and RFID reader head 14. The reverse is also true, as a controller may control the support adjustment devices (and lower support adjustment devices, if provided) to adjust the lengths of the supports (and lower supports, if provided) to move the platform 12 and RFID reader head 14 to a desired position.

The length of the supports 16a-16d (and lower supports 28-28d, if provided) may be determined by a controller of the system in any of a number of ways, which may depend upon the nature of the supports 16a-16d (and lower supports 28-28d, if provided) and associated support adjustment devices 20a-20d (and lower support adjustment devices 30-30d, if provided). For example, if a support 16a-16d or lower support 28-28d is provided as a flexible tether and the associated support adjustment device 20a-20d or lower support adjustment device 30-30d is provided as a winch, then each winch may include an associated rotary encoder that monitors the orientation of a drum or cylinder of the winch, which relates directly to the length of the associated tether. In other embodiments, different mechanisms and methods may be employed for determining the length of the various supports 16a-16d (and lower supports 28-28d, if provided) without departing from the scope of the present disclosure. If flexible tethers or supports are employed, then it may be advantageous for them to have a known extension under force, which may be considered by the controller when determining the position of the platform 12 and RFID reader head 14 and/or the length of the tethers.

Figure 5:
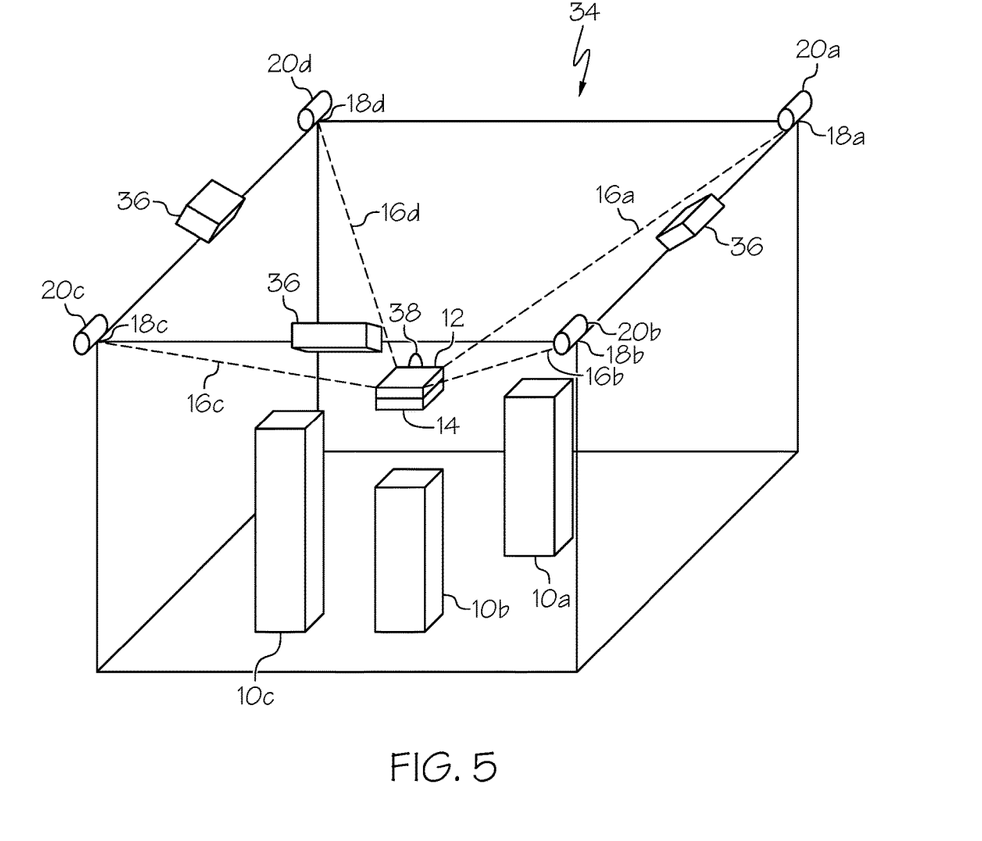
FIG. 5 is a perspective view of another embodiment of a system for locating RFID tags in a large area, with an optical emitter and camera system for determining the location of an RFID reader.

FIG. 5 illustrates a system 34 incorporating a different mechanism for determining the position of the platform 12 and RFID reader head 14 and/or the length of the supports 16a-16d and/or lower supports 28-28d. The system 34 of FIG. 5 includes a camera system with one or more cameras 36 positioned throughout the area. While FIG. 5 illustrates three cameras 36 positioned throughout the area, it is within the scope for the system 34 to include fewer or more cameras 36. The platform 12 and/or RFID reader head 14 includes at least one optical emitter 38, with the camera system being configured to detect the optical emitter(s) 38. With the cameras 36 at known locations (either by being fixedly secured to a surface within the area or by having associated positioning technology, such as GPS, for a mobile system), the position of the optical emitter(s) 38 within the frame of an image received by the camera(s) 36 may be used by a system controller to determine the position of the platform 12 and/or RFID reader head 14 within the area. With this information and system configuration, the system controller may precisely control the position of the platform 12 and/or RFID reader head 14 within the area.

In a variation of the system 36 of FIG. 5, one or more cameras may be associated with the platform 12 and/or the RFID reader head 14. The camera(s) observe the area around the platform 12 and/or RFID reader head 14 and identify one or more landmarks within the area, which may include any distinctive feature of the area, such as an object or a symbol (e.g., a barcode secured to a wall of the area for the purpose of orienting the platform 12 and/or RFID reader head 14). Preferably, the selected landmarks are stationary within the area, but it is also within the scope of the present disclosure for a landmark to be mobile within the area. Based on the location of the landmark or landmarks from the perspective of the camera(s), a system controller associated with the camera(s) may determine the position of the platform 12 and/or the RFID reader head 14 within the area. With this information and system configuration, the system controller may precisely control the position of the platform 12 and/or RFID reader head 14 within the area.

Figure 6:
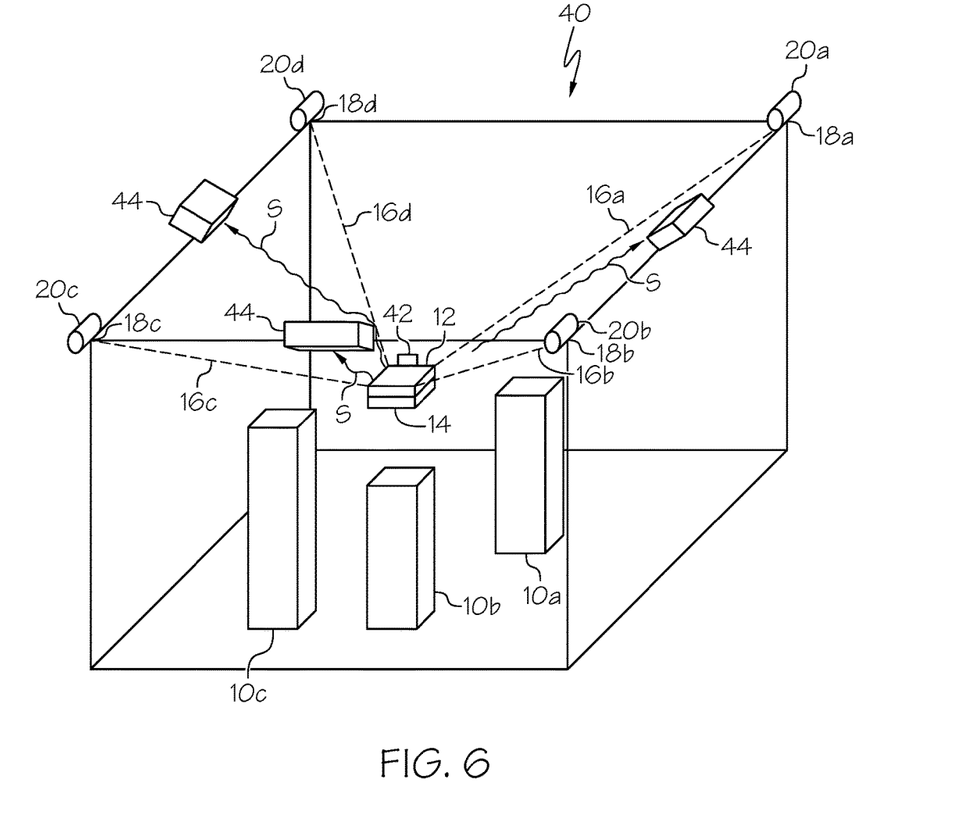
FIG. 6 is a perspective view of another embodiment of a system for locating RFID tags in a large area, in which radio signals are employed to determine the location of an RFID reader.

FIG. 6 illustrates a system 40 incorporating another alternative mechanism for determining the position of the platform 12 and RFID reader head 14 and/or the length of the supports 16a-16d and/or lower supports 28-28d. The system 40 of FIG. 6 includes at least one radio signal emitter 42 and at least one radio signal receiver 44. In the illustrated embodiment, the radio signal emitter 42 is associated with the platform 12 and/or the RFID reader head 14, while a plurality of radio signal receivers 44 are positioned throughout the area. The radio signal emitter 42 emits a radio signal "S" that is received by one or more of the radio signal receivers 44. The time it takes for the radio signal "S" to travel from the radio signal emitter 42 to a particular radio signal receiver 44 is indicative of the distance between the radio signal emitter 42 and the radio signal receiver 44, which is indicative of the distance between the platform 12 and/or the RFID reader head 14 and the radio signal receiver 44. Time of flight determination may be achieved by any suitable method, which may include measurement of the amplitude or phase of the signal or associated modulations, by the use of impulses or spread spectrum techniques (e.g., direct sequence modulation by a suitable pseudo random number code), or swept frequency methods (commonly referred to as "chirp").

By determining the distance between the radio signal emitter 42 (and, hence, the platform 12 and/or the RFID reader head 14) and the different radio signal receivers 44, a system controller can precisely determine and control the location of the platform 12 and/or the RFID reader head 14 within the area. In one embodiment, the radio signal "S" emitted by the radio signal emitter 42 is the RFID read signal emitted by the RFID reader (in which case, the RFID reader may serve as the radio signal emitter 42), but it is also within the scope of the present disclosure for the radio signal emitter 42 to emit a different radio signal, such as a wireless network transmission.

In a variation of the system 40 of FIG. 6, a plurality of radio signal emitters 42 may be positioned throughout the area, with a radio signal receiver 44 associated with the platform 12 and/or the RFID reader head 14. Each radio signal emitter 42 emits a different radio signal, which is received by the radio signal receiver 44. The time it takes for each radio signal to travel from the associated radio signal emitter 42 to the radio signal receiver 44 is indicative of the distance between the radio signal emitter 42 and the radio signal receiver 44, which is indicative of the distance between the platform 12 and/or the RFID reader head 14 and the radio signal emitters 42. By determining the distance between the radio signal receiver 44 (and, hence, the platform 12 and/or the RFID reader head 14) and the different radio signal emitters 42, a system controller can precisely determine and control the location of the platform 12 and/or the RFID reader head 44 within the area. In one embodiment, the time of flight of a radio signal from a known source (e.g., a GPS satellite or other positioning system) may be employed, in which case the system may be used in an outdoor area.

As described above, systems according to the present disclosure (or individual components of such systems) may include additional elements or features without departing from the scope of the present disclosure. For example, at least one antenna 46 may be associated with the RFID reader head 14 (FIGS. 7 and 8) or with the platform 12 (FIGS. 9 and 10) for interacting with the RFID tags 10a-10c in the area and/or a component of the monitoring system, such as a host system 22. The host system 22 may be associated with a fixed or mobile location of the area and configured to perform any of a number of functions. For example, a host system 22 may be programmed to provide power and/or data communications. If multiple antennae are provided (e.g., a near-field antenna and an antenna with longer range), then the host system 22 may provide control signals for a switch to multiplex between antennae. In the illustrated embodiments, the host system 22 is positioned at an anchor position 18a of one of the supports 16a, but the host system 22 may be located elsewhere within the area without departing from the scope of the present disclosure.

Figure 7:
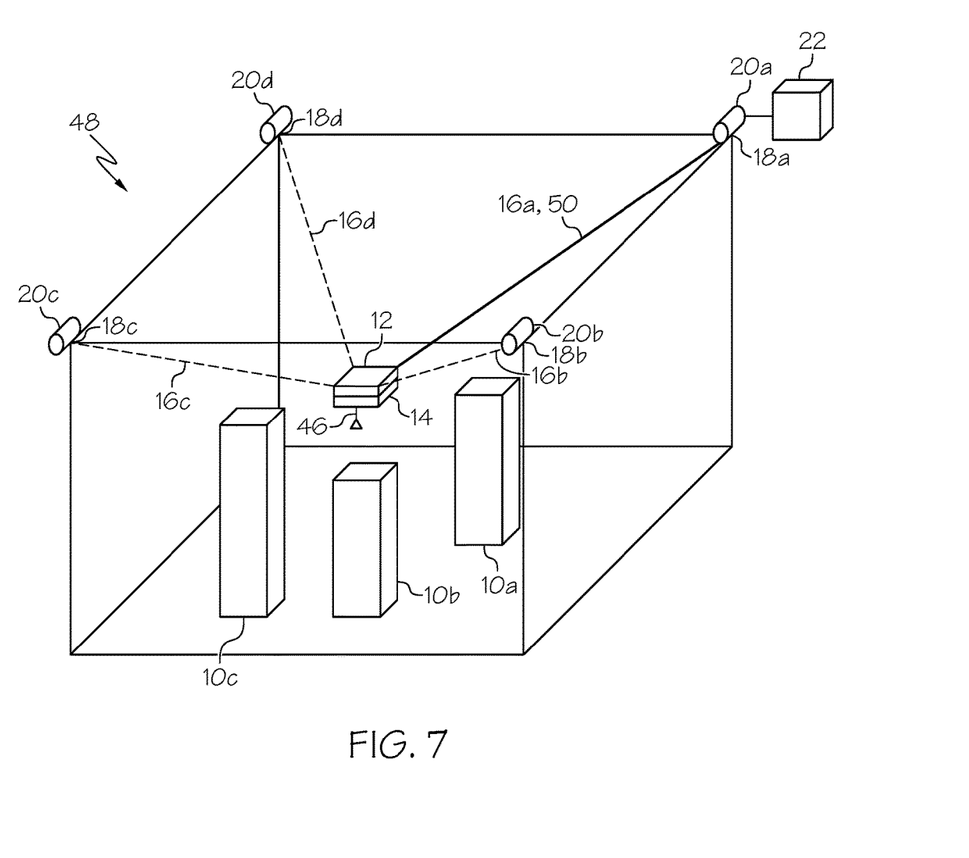
FIG. 7 is a perspective view of another embodiment of a system for locating RFID tags in a large area, including a host control system.

In the system 48 of FIG. 7, a cable 50 extends between the platform 12 or RFID reader head 14 and the host system 22, providing an RF connection therebetween. The cable 50 is illustrated as being collocated with one of the supports 16a (which may be advantageous if the host system 22 is located at the anchor position 18a of the support 16a), but it is also within the scope of the present disclosure for the cable 50 to be located away from the supports 16a-16d. Preferably, the cable 50 is stretchable or flexible, to accommodate the movement of the platform 12 and RFID reader head 14 with respect to the host system 22.

Figure 8:
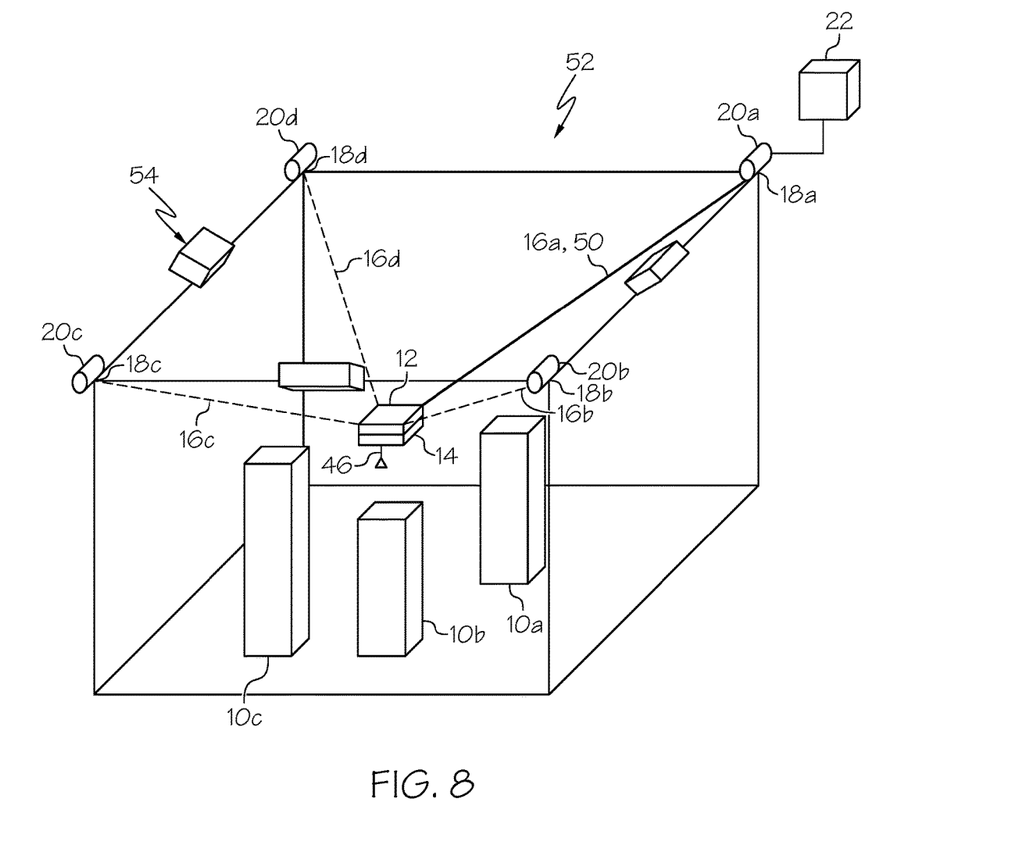
FIG. 8 is a perspective view of another embodiment of a system for locating RFID tags in a large area, including a host control system associated with an RFID reader by a cable.

The system 52 of FIG. 8 is similarly configured to the system 48 of FIG. 7, but further includes a locator system 54, which may be provided as a camera-based system (as in FIG. 5) or a radio signal-based system (as in FIG. 6) or any other suitable system for determining the location of the platform 12 and/or RFID reader head 14 within the area. In a system 52 of the type shown in FIG. 8, the host system 22 may have additional functionality for interaction with the locator system 54. For example, the host system 22 may include a controller that receives raw data from the locator system 54 and processes the data to determine the location of the platform 12 and/or RFID reader head 14 within the area. With that information, the controller may communicate with the support adjustment devices 20a-20d to cause them to change the length of their associated support 16a-16d to move the platform 12 and/or RFID reader head 14 to a different position within the area.

Figure 9:
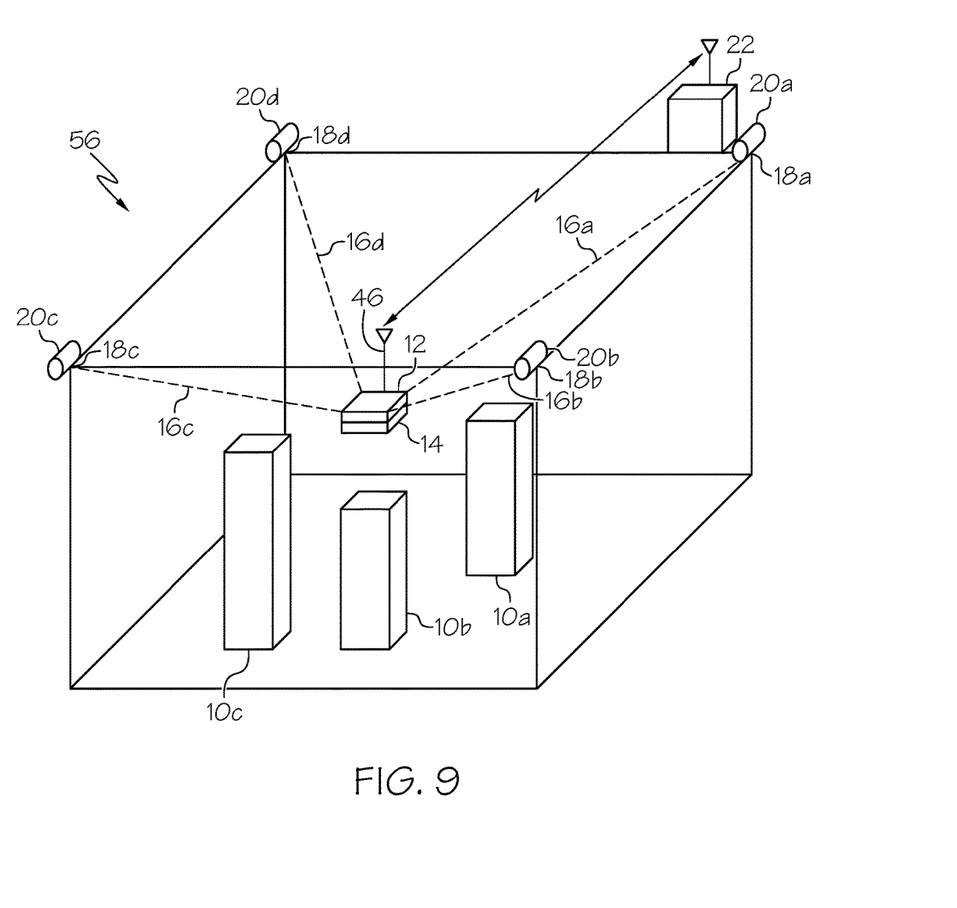
FIG. 9 is a perspective view of another embodiment of a system for locating RFID tags in a large area, including a host control system that is wirelessly associated with an RFID reader.
Figure 10:
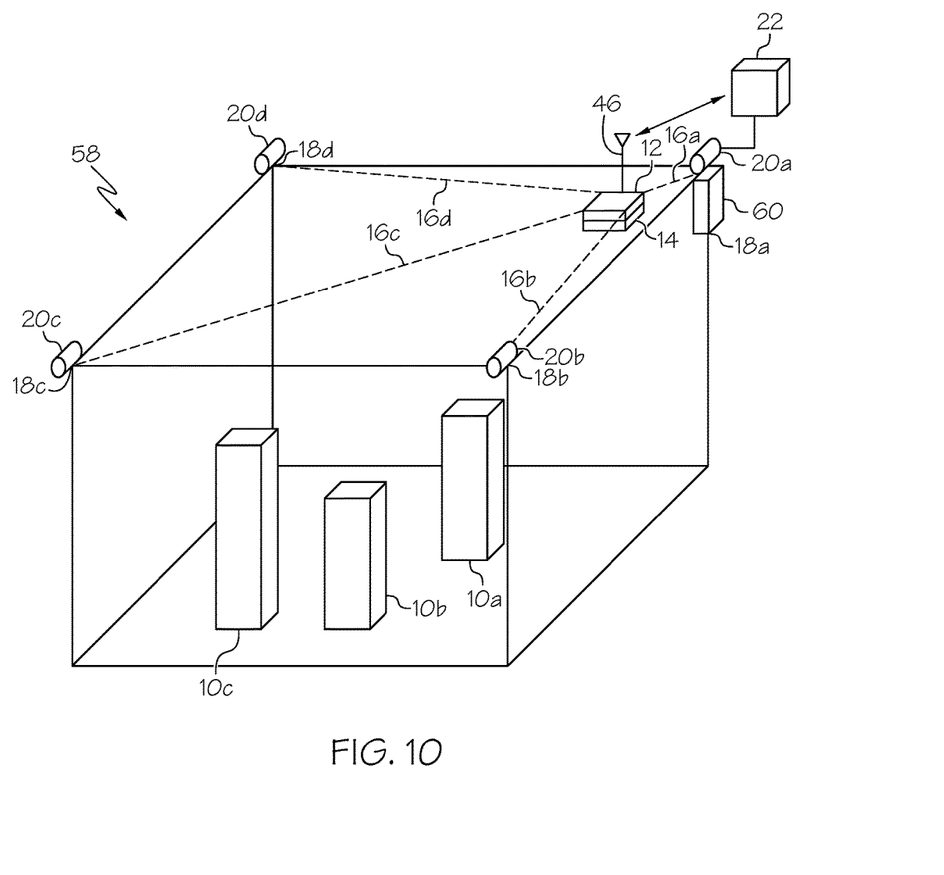
FIG. 10 is a perspective view of another embodiment of a system for locating RFID tags in a large area, including a host control system and a charger.

The systems 56 and 58 of FIGS. 9 and 10 differ from the systems 48 and 52 of FIGS. 7 and 8 in that the cable 50 is omitted, with the RFID reader head 14 having a power source (e.g., a rechargeable battery) incorporated therein. In the embodiment of FIG. 9, the RFID reader head 14 communicates with the host system 22 via a wireless data link.

As described above, the host system 22 may include a controller that coordinates the operation of the support adjustment devices 20a-20d to move the platform 12 and RFID reader head 14 through the area, but it is also within the scope of the present disclosure for the RFID reader head 14 to be more autonomous and send support length control signals and/or accumulating data on the RFID tags 10a-10c that are being read (including received signal strength).

In the embodiment of FIG. 10, the system 58 further includes a charger 60 associated with a fixed location within the area. The platform 12 and RFID reader head 14 are brought into the vicinity of the charger 60 (as shown) to recharge the internal power source. This transfer of power from the charger 60 to the internal power source of the RFID reader head 14 may be achieved via contact therebetween or wirelessly (e.g., via a relatively low frequency magnetic field generated by the charger 60). In the illustrated embodiment, the charger 60 is located adjacent to the anchor position 18a of one of the supports 16a, which may be advantageous when moving the RFID reader head 14 into the vicinity of the charger 60, but the charger 60 may be positioned elsewhere within the area without departing from the scope of the present disclosure.

In a further exemplary embodiment, the RFID reader platform equipped with an output device such as an optical illuminator, for example a laser or projector, so the reader platform can operate interactively with a person searching for an item, by projecting either a simple spot of light, or a descriptive projection, onto the product. Other forms of output may include an audio output or short range radio emission at a frequency compatible with a device such as a hand-held radio.

In a still further exemplary embodiment, the reader platform includes sensors designed to detect other objects in the area, such as person or a mobile item like a fork-lift truck, where, as their position is variable, the system doesn't have in its internal map of the space, and hence is able to take avoiding action to prevent collisions.

The invention has many other uses as well, including a system deployed into an environment where the position of objects is not know, the head, equipped with a system such as camera or camera with a suitable laser illuminator, creates a 3D map of the space before starting an inventory. Example of such situations would be where containers containing supplies have been deposited in a location as part of a civil or military deployment, but the 3D structure, such as the stacking of the containers and their relative position is not known. This learning mode may also be used in more fixed locations such as a warehouse or store where a precise initial configuration of items such as racks or display units is not know, or some elements move. The need to carry out a re-mapping exercise may be triggered by the sensors mentioned in 2 detecting an obstruction in an unexpected location.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A system for locating RFID tags in an area, comprising:
   a platform;
   an RFID reader head associated with the platform;
   at least one support extending between the platform and an anchor position within an area, with a separate anchor position being associated with each support; and
   at least one support adjustment device, with a separate support adjustment device being associated with each support, wherein each support adjustment device is operable to adjust the length of the associated support between the platform and the anchor position associated with said support, thereby varying the location of the RFID reader head in the area.

2. The system of claim 1, wherein said at least one support comprises at least one tether and said at least one support adjustment device comprises a winch.

3. The system of claim 1, wherein
   said at least one support comprises a plurality of supports associated with the platform, and
   said at least one support adjustment device comprises a plurality of support adjustment devices.

4. The system of claim 3, wherein each support comprises a tether and each support adjustment devices comprises a winch.

5. The system of claim 1, further comprising
   at least one lower support associated with the platform and the RFID reader head, and
   at least one lower support adjustment device, with a separate lower support adjustment device being associated with each lower support, wherein each lower support adjustment device is operable to adjust the length of the associated lower support between the platform and the RFID reader head.

6. The system of claim 5, wherein said at least one lower support comprises at least one tether and said at least one lower support adjustment device comprises a winch.

7. The system of claim 5, wherein
   said at least one lower support comprises a plurality of lower supports associated with the platform, and
   said at least one lower support adjustment device comprises a plurality of lower support adjustment devices.

8. The system of claim 7, wherein each lower support comprises a tether and each lower support adjustment devices comprises a winch.

9. The system of claim 1, wherein the orientation of at least a portion of the RFID reader head with respect to the platform is adjustable.

10. The system of claim 1, further comprising
    an optical emitter associated with the platform and/or the RFID reader head, and
    a camera system configured to detect the optical emitter, thereby determining the location of the platform and/or the RFID reader head in the area.

11. The system of claim 1, further comprising
    a radio signal emitter, and
    a radio signal receiver, with one of the radio signal emitter and the radio signal receiver associated with the platform and/or the RFID reader head and the other one of the radio signal emitter and the radio signal receiver positioned elsewhere within the area, wherein the radio signal emitter receives a radio signal from the radio signal emitter to determine the location of the platform and/or the RFID reader head in the area.

12. The system of claim 1, further comprising a camera associated with the platform and/or the RFID reader head and configured to identify one or more landmarks within the area, thereby determining the location of the platform and/or the RFID reader head in the area.

13. The system of claim 1, further comprising a host system programmed to control movement of the platform and RFID reader head through the area.

14. The system of claim 13, further comprising a cable extending between the platform or the RFID reader head and the host system and configured to provide an RF connection between the RFID reader head and the host system.

15. The system of claim 1, comprising
    a power source incorporated into the RFID reader head, and
    a charger positioned within the area and configured to provide power to the power source when the RFID reader head is brought into the vicinity of the charger.

* * * * *